(12) United States Patent
Wittrock et al.

(10) Patent No.: US 10,060,319 B2
(45) Date of Patent: Aug. 28, 2018

(54) INTERNAL COMBUSTION ENGINE

(71) Applicant: DEUTZ Aktiengesellschaft, Cologne (DE)

(72) Inventors: Meike Wittrock, Buedingen (DE); Ulf Klein, Much (DE); Gerald Leyh, Cologne (DE)

(73) Assignee: DEUTZ Aktiengesellschaft, Cologne (DE)

( * ) Notice: Subject to any disclaimer, the term of this patent is extended or adjusted under 35 U.S.C. 154(b) by 0 days.

(21) Appl. No.: 15/425,437

(22) Filed: Feb. 6, 2017

(65) Prior Publication Data
US 2017/0218820 A1 Aug. 3, 2017

Related U.S. Application Data

(63) Continuation of application No. 14/622,416, filed on Feb. 13, 2015, now Pat. No. 9,656,210.

(30) Foreign Application Priority Data

Feb. 14, 2014 (DE) ........................ 10 2014 001 879

(51) Int. Cl.
| | |
|---|---|
| *F01N 3/00* | (2006.01) |
| *F01N 3/20* | (2006.01) |
| *F01N 3/035* | (2006.01) |
| *F01N 3/10* | (2006.01) |
| *F01N 13/00* | (2010.01) |

(52) U.S. Cl.
CPC .......... *F01N 3/2066* (2013.01); *F01N 3/035* (2013.01); *F01N 3/103* (2013.01); *F01N 13/009* (2014.06); *F01N 2240/02* (2013.01); *F01N 2340/06* (2013.01); *F01N 2560/026* (2013.01); *F01N 2570/18* (2013.01); *F01N 2610/02* (2013.01); *F01N 2610/10* (2013.01); *F01N 2610/1453* (2013.01)

(58) Field of Classification Search
USPC ......... 60/274, 286, 295, 297, 298, 301, 303, 60/320
See application file for complete search history.

(56) References Cited

U.S. PATENT DOCUMENTS

| | | | |
|---|---|---|---|
| 6,895,747 B2 | 5/2005 | Upadhyay et al. | |
| 7,647,767 B2 | 1/2010 | Osaku et al. | |
| 7,849,674 B2* | 12/2010 | Masuda ............. | B01D 53/9409 60/286 |
| 7,950,223 B2 | 5/2011 | Breuer et al. | |
| 7,966,811 B2 | 6/2011 | Reed et al. | |
| 8,122,710 B2 | 2/2012 | Schmale et al. | |
| 8,250,857 B2 | 8/2012 | Driscoll et al. | |

(Continued)

FOREIGN PATENT DOCUMENTS

| | | |
|---|---|---|
| DE | 103 48 800 | 6/2004 |
| DE | 10 2007 011 184 | 9/2008 |

(Continued)

*Primary Examiner* — Binh Q Tran
(74) *Attorney, Agent, or Firm* — Davidson, Davidson & Kappel, LLC

(57) ABSTRACT

An internal combustion engine, including at least one exhaust-gas line having at least one device for the aftertreatment of the exhaust gas and at least one urea-water solution tank, whereby the urea-water solution tank 3 is located close to the engine, is provided.

9 Claims, 4 Drawing Sheets

(56) References Cited

U.S. PATENT DOCUMENTS

| | | | |
|---|---|---|---|
| 8,272,353 B2 * | 9/2012 | Dincer | F02B 43/10 123/1 A |
| 8,303,174 B2 * | 11/2012 | Kasahara | F01N 3/2066 374/1 |
| 8,511,077 B2 | 8/2013 | Schwarzkopf | |
| 8,677,737 B2 | 3/2014 | Kamiya et al. | |
| 8,915,066 B2 | 12/2014 | Vorsmann et al. | |
| 8,959,903 B2 | 2/2015 | Myer et al. | |
| 8,984,866 B2 | 3/2015 | Miebach et al. | |
| 9,222,391 B2 | 12/2015 | Ikeda et al. | |
| 9,656,210 B2 * | 5/2017 | Wittrock | B01D 53/9477 |
| 2004/0098971 A1 | 5/2004 | Upadhyay et al. | |
| 2009/0211236 A1 | 8/2009 | Schwarzkopf | |
| 2010/0077739 A1 * | 4/2010 | Rodman | F01N 3/035 60/301 |
| 2011/0138780 A1 | 6/2011 | Millet et al. | |
| 2011/0179773 A1 | 7/2011 | Hodgson et al. | |
| 2012/0045378 A1 * | 2/2012 | Soukhojak | B01B 1/005 423/212 |
| 2012/0110986 A1 | 5/2012 | Vorsmann et al. | |
| 2012/0117949 A1 | 5/2012 | Miebach | |
| 2013/0014496 A1 | 1/2013 | Fogg et al. | |
| 2013/0167512 A1 | 7/2013 | Brueck et al. | |
| 2015/0176450 A1 | 6/2015 | Balthes et al. | |
| 2015/0231564 A1 | 8/2015 | Wittrock et al. | |
| 2015/0231565 A1 | 8/2015 | Wittrock et al. | |

FOREIGN PATENT DOCUMENTS

| | | |
|---|---|---|
| DE | 10 2007 029 674 | 1/2009 |
| DE | 10 2007 042 836 | 3/2009 |
| DE | 10 2009 009 538 | 8/2009 |
| DE | 10 2008 012 087 | 9/2009 |
| DE | 102008038984 | 2/2010 |
| DE | 102009011019 | 9/2010 |
| DE | 10 2009 025 135 | 12/2010 |
| DE | 102014019427 | 8/2015 |
| EP | 1054722 | 11/2000 |
| EP | 2 177 728 | 4/2010 |
| EP | 2 192 279 | 6/2010 |
| EP | 2907564 | 8/2015 |
| EP | 2907984 | 8/2015 |
| JP | 2014015874 | 1/2014 |
| WO | WO99/39809 | 8/1999 |
| WO | WO2008/020207 | 2/2008 |
| WO | WO 2010/139429 | 12/2010 |
| WO | WO 2012/022687 | 2/2012 |
| WO | WO2012/107637 | 8/2012 |
| WO | WO2013/185862 | 12/2013 |

* cited by examiner

Source: C. Hagelücken et al., "Autoabgaskatalysatoren" [exhaust-gas catalytic converters for vehicles], 2nd edition, published by expert Verlag, 2005, page 92

INTERNAL COMBUSTION ENGINE

This is a Continuation of U.S. patent application Ser. No. 14/622,416, filed Feb. 13, 2015 which claims the benefit of German Patent Application DE 10 2014 001 879.2, filed Feb. 14, 2014, both of which are hereby incorporated by reference herein.

BACKGROUND

The invention relates to an internal combustion engine. Such internal combustion engines are known, for example, from German patent document DE 103 48 800, which discloses a method to control a reductant feed system comprising at least one heating element. Upstream, the feed system is connected to an SCR catalytic converter. During the air-assisted injection of the reductant into the feed system, an evaporated mixture of air and reductant is formed over the heated element, and this mixture is introduced into an exhaust-gas mixture that is entering the SCR catalytic converter. An aqueous urea solution is employed as the reductant. The entire feed system, including the mixing unit for the urea-water solution and air as well as the heating element or evaporator unit, is integrated downstream from the SCR catalytic converter into the exhaust-gas carrying pipe downstream from the engine outlet. The amount of heat necessary to evaporate the mixture of urea-water solution and air is generated electrically by a 12-volt battery current.

German patent document DE 10 2007 029 674 discloses an assembly for nitrogen oxide reduction in a gas stream containing oxygen, especially in an exhaust-gas system of an internal combustion engine, comprising an SCR catalytic converter arranged in a gas line that carries nitrogen oxide and oxygen, a conversion reactor with which a solution containing an ammonia precursor is converted into an ammonia solution, and an evaporator unit configured as a separate component, which is located downstream from the conversion reactor and in which the ammonia solution is evaporated upstream from the SCR catalytic converter before being fed into the gas line. The solution containing an ammonia precursor (preferably a urea-water solution) is converted into an ammonia solution takes place according to the invention using microwaves. Upstream from the evaporator unit configured as a separate component, there can be a heat exchanger in order to heat up the ammonia solution so as to reduce the energy needed for the evaporation in that, for instance, the heat of the exhaust-gas return line is used. The evaporator itself is an electrically operated heating element.

German patent document DE 10 2007 042 836 discloses a device for the after-treatment of the exhaust gas of a motor vehicle using a liquid that releases ammonia, for example, a urea-water solution, comprising a reservoir to store the liquid, whereby a temperature-control device is provided for purposes of regulating the temperature of the liquid. In order to cool the liquid, the temperature-control device is associated with a cooling circuit of the motor vehicle. This can be the cooling circuit of the internal combustion engine or an air-conditioning circuit. The temperature-control device is configured as a separate component. Thanks to the temperature-control device, the liquid can be heated, thus preventing it from freezing, or else the liquid can be heated to a favorable temperature level that yields an excellent purification of the exhaust gas.

German patent document DE 10 2009 009 538 discloses a system to regulate the temperature of a fluid additive, preferably a urea-water solution, for the exhaust-gas system of an internal combustion engine, said system being characterized by means to bring about a heat exchange between the additive and a coolant circuit of a coolant installation, especially of an air-conditioning unit.

The development described in German patent document DE 10 2007 011 184 is based on the objective of further reducing the emissions of internal combustion engines, especially of diesel engines, and minimizing the installation space needed to treat the exhaust gas. For purposes of achieving this objective, a heat exchanger is disclosed for cooling the exhaust gas from an internal combustion engine of a motor vehicle in order to return the exhaust gas to the internal combustion engine. For cooling purposes, this heat exchanger has at least a first flow channel through which at least a first fluid flows, and at least a second flow channel through which a second cooling fluid flows, and this heat exchanger also has a housing to accommodate the at least one first flow channel and the at least one second flow channel. The housing has at least one inflow section through which the second fluid flows into the heat exchanger and at least one outflow section through which the second fluid flows out of the heat exchanger. The heat exchanger is characterized by at least one device that converts a liquid urea solution into at least ammonia gas.

International patent WO 2012/022687 discloses a method for operating an exhaust-gas treatment device having at least one reservoir for a reducing agent and at least one feed device for the reducing agent, whereby the method encompasses at least the following steps: a) checking the filling level of the at least one reservoir; b) checking the current exhaust-gas mass flow; c) adding reducing agent whenever the filling level of the at least one reservoir falls below a minimum filling level and the exhaust-gas mass flow is within a low-load range. In a special embodiment, one of the following actions is carried out in step c): heating at least the exhaust-gas mass flow or the reducing agent and feeding in reducing agent. In this process, the heat feed leading all the way to the reducing agent can be ensured or improved by external electric heaters.

German patent document DE 10 2009 025 135 discloses a device for evaporating a urea-water solution, comprising a conveying channel for the urea-water solution extending through at least a first zone and a second zone in order to introduce thermal energy, whereby the two zones can be heated separately from each other and, in the second zone, the conveying channel at first has a meandering course in a second inlet area, and subsequently a straight course. In the first zone, the urea-water solution is preheated to a temperature within the range from 100° C. to 180° C. [212° F. to 356° F.], while in the second zone, it is evaporated at a temperature ranging from 420° C. to 490° C. [788° F. to 914° F.].

German patent document DE 10 2008 012 087 discloses an evaporator unit for generating a gas stream containing ammonia out of a urea-water solution, said unit being likewise configured as a separate component.

Industrial engines according to the state of the art are typically operated with catalytically active exhaust-gas after-treatment (ANB) systems according to European patent EP-B 1 054 722 (so-called "SCRT® systems") consisting of DOC/(c)DPF+SCR/ASC where a urea-water solution (HWL) is metered in upstream from the SCR/ASC catalytic converter in order to comply with the applicable emission regulations (Tier 4 Final (US)/Stage IV (EU) and subsequent regulations).

In order for the exhaust-gas after-treatment system to be able to operate with the requisite cleaning efficiency, minimum exhaust-gas temperatures and catalyst operating temperatures of 230° C. [446° F.] or more are necessary.

In low-load operating states, the required minimum exhaust-gas temperatures can only be provided by means of engine-related heating measures (for instance, throttling the engine). The energy that is introduced into the exhaust gas in order to attain the requisite exhaust-gas temperatures is no longer available to the drive train. This translates into a diminished degree of drive efficiency for the engine and into greater fuel consumption and thus also increased $CO_2$ emissions.

Regeneration of the closed diesel particulate filter has a very detrimental effect on fuel consumption. Exhaust-gas temperatures of about 600° C. [1112° F.] are needed so that the soot deposited in the filter can be burned off in a controlled manner. In order to achieve such temperatures, in addition to the passive regeneration, as a rule there is a need to employ active measures such as, for example, additional fuel injection and exothermal conversion of the resultant unburned hydrocarbons on the DOC or else active regeneration measures, for instance, fuel-operated burners according to European patent applications EP-A 2 177 728, EP-A 2 192 279 or international patent document WO 2010/139429.

For the operation of the SCR system, a urea-water solution containing 32.5% urea is typically used as the reducing agent. In order to release ammonia from this, 67.5% of the water first has to be evaporated and the urea has to be hydrolytically converted into ammonia and $CO_2$.

SUMMARY OF THE INVENTION

In today's SCR systems, the aqueous urea solution (urea-water solution [HWL], also AdBlue®) needed to generate ammonia as the reducing agent is injected in a liquid, non-temperature-controlled state into the exhaust gas upstream from the SCR catalyst. The amount of heat needed to completely convert the urea-water solution into the gas phase, accompanied by the (quantitative) release of ammonia (=urea processing), has to be provided in its entirety by the hot exhaust gas.

Particularly at low-load operating points, however, the amount of heat contained in the exhaust gas is often not sufficient to completely process the injected urea-water solution necessary for the complete reduction of the nitrogen oxides that are likewise present in the exhaust gas. This results in deposits (crystallization) of urea and urea-derived products such as isocyanic acid, cyanuric acid and melamine in the exhaust-gas system, which might cause a complete blockage of the exhaust-gas system as well as conversion losses in the SCR reaction due to inadequate provision of the stoichiometric amount of ammonia needed for the nitrogen oxide reduction.

It is an object of the present invention to improve the processing and hydrolysis of the urea used to form ammonia by means of a suitable pre-treatment of the urea-water solution in such a way that a sufficient amount of ammonia can be generated, even at low-load operating points, so as to insure complete SCR conversion without any detrimental crystallization.

In this context, an object is to avoid the need to install additional, cost-intensive components such as heat exchangers, heaters and glow plugs in the exhaust-gas system or in the periphery of the engine.

An internal combustion engine is provided herein, whereby the internal combustion engine comprises at least one exhaust-gas line having at least one device for the after-treatment of the exhaust gas and at least one urea-water solution tank (HWLT) so that the tank is located close to the engine.

An advantageous embodiment puts forward an industrial engine with an exhaust-gas after-treatment system consisting of DOC+SDPF+SCR/ASC, whereby, instead of the injection of a urea-water solution, the urea is processed in an $NH_3$ generator installed on the engine and ammonia is metered into the exhaust gas upstream from the SDPF, optionally additionally upstream from the SCR/ASC, and that there is also a passive regeneration concept for the SCR catalytically activated particulate filter (SDPF). An additional standstill regeneration of the particulate filter takes place within the scope of the servicing and so does the monitoring of the counter-pressure of the exhaust gas via the SDPF, so that "emergency standstill regeneration procedures" can be carried out between the service intervals if the soot-regeneration rates are insufficient.

Owing to the (partial) integration of SCR catalyst volumes into the particulate filter, the exhaust-gas after-treatment system can be smaller than conventional systems. This leads to improved heating characteristics of the exhaust-gas after-treatment system following a cold start and also to considerably lower heat losses via the exhaust-gas system. However, there are also advantages in terms of space. The SCR catalytic converter downstream from the particulate filter is employed selectively, namely, whenever the SCR volume that can be integrated into the particulate filter is not sufficient to ensure an $NO_x$ conversion rate >97% in the entire system over the running time (8000 operating hours).

The temperature threshold for metering in the reducing agent can be lowered to well below 200° C. to 230° C. [392° F. to 446° F.] by removing the urea processing to form the ammonia from the exhaust-gas system and by metering the ammonia directly into the exhaust-gas after-treatment system.

The limitation of the lower temperature threshold for the metering process falls within the range of the operating temperature window of the SCR catalytic converter. There is no risk of crystallization of urea and urea-derived products such as isocyanic acid, cyanuric acid and melamine that could result from the incomplete degradation of urea and that could lead to a complete blockage of the exhaust-gas system if the operating temperatures are too low. There is likewise no reduction in the $NO_x$ removal efficiency due to incomplete processing of the urea to form ammonia. Overdosing of the reducing agent in order to compensate for incomplete urea processing at low-load operating points becomes superfluous. It is possible to reduce the ASC and/or to completely avoid the ammonia secondary emission of the (permissible) 10 Vppm on average over time without ASC.

The introduction of the SCR catalytically activated particulate filter with the passive filter regeneration concept gives rise to soot burn-off according to the so-called "CRT reaction"=oxidation of the deposited soot particles with $NO_2$, $$C_n + 2nNO_2 \rightarrow nCO_2 + 2nNO. \qquad \text{CRT® reaction}$$

This reaction competes with the SCR reaction. When it comes to the SCR reaction, there are three reaction mechanisms that transpire at different reaction rates (RG):

$$4NO + 4NH_3 + O_2 \rightarrow 4N_2 + 6H_2O \quad \text{medium reaction rate} \quad \text{standard SCR}$$

$$NO + NO_2 + 2NH_3 \rightarrow 2N_2 + 3H_2O \quad \text{high reaction rate} \quad \text{fast SCR}$$

$$6NO_2 + 8NH_3 \rightarrow 2N_2 + 12H_2O \quad \text{low reaction rate} \quad \text{slow SCR}$$

For purposes of providing sufficient NO$_2$ for the soot burn-off needed for the passive regeneration of the particulate filter, the upstream DOC has to provide more than 50% NO$_2$ in the NO$_x$ at operating points up to an exhaust-gas temperature of 350° C. to 375° C. [662° F. to 707° F.]. If the "CRT® reaction" transpires more quickly than the "slow SCR reaction", the NO$_2$ excess should be available for the soot burn-off, thus ensuring a passive regeneration of the particulate filter.

A DOC operating temperature above approximately 300° C. falls outside of the kinetically controlled range. Then, the NO$_2$ concentration that can be generated in the exhaust gas by means of the catalytic converter is no longer a function of the capacity of the catalytic converter, but rather, exclusively of the position of the thermodynamic equilibrium. At temperatures of more than 400° C. [752° F.], NO$_2$ concentrations of more than 50% in the NO$_x$ can no longer be generated.

As shown in FIG. 3, soot oxidation with NO$_2$ already sets in at 250° C. [482° F.]. Above 300° C. [572° F.], a passive regeneration of the particulate filter is possible with a high degree of operational reliability (source: C. Hagelücken et al., "Autoabgaskatalysatoren" [exhaust-gas catalytic converters for vehicles], $2^{nd}$ edition, published by expert Verlag, 2005, page 102). Under these boundary conditions, the competition between the SCR reaction and the "CRT® reaction" can be managed if adequately high NO$_2$ concentrations are provided.

If the amount of NO$_2$ provided by the DOC is not enough to productively resolve the competition situation between the SCR reaction on the one hand and the soot regeneration on the other hand, the possibility exists to limit the NO$_x$ removal efficiency of the SCR catalytically activated filter by restricting the amount of reducing agent that is metered in, so as to ensure a sufficient passive regeneration of the particulate filter. In this case, a second metering site for ammonia upstream from an (additional) SCR catalytic converter is provided in an alternative embodiment, so that the requisite NO$_x$ removal efficiency >97% is ensured.

The fact that ammonia is metered in as the reducing agent instead of a urea-water solution eliminates the need for processing at the exhaust-gas temperature. A challenging aspect for metering gaseous NH$_3$ into the exhaust gas is to ensure the homogenization of the NH$_3$-exhaust-gas mixture over the shortest possible paths upstream from the inlet of the SDPF catalytic converter.

BRIEF DESCRIPTION OF THE DRAWINGS

The invention as well as the technical circumstances will be explained below on the basis of the figures. It should be pointed out here that the invention is not restricted to the subject matter of the figures. The following is shown schematically.

DETAILED DESCRIPTION

Figure 1:
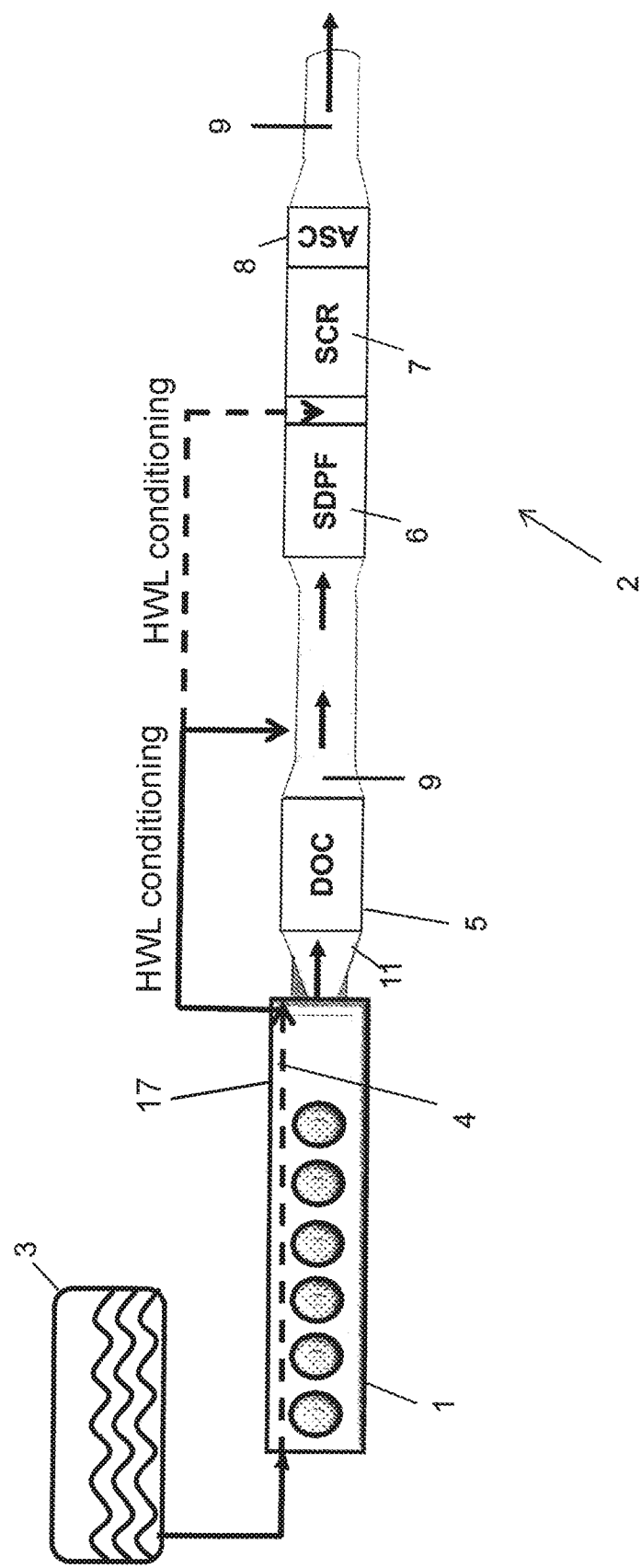
FIG. 1 a preferred configuration variant of the device according to the invention.

FIG. 1 shows an internal combustion engine 1 comprising an exhaust-gas line 2, a urea-water solution tank 3 and an NH$_3$ generator 4. The NH$_3$ generator 4 is located essentially in the area of the crankcase 17 of the internal combustion engine 1. A NO$_x$ sensor 9 and an NH$_3$ feeding device are arranged in the exhaust-gas line 2 between the DOC 5 and the SDPF 6 in the flow direction of the exhaust gas, and the NH$_3$ feeding device is supplied by the NH$_3$ generator 4. The NH$_3$ generator 4 can also supply the NH$_3$ feeding device between the SDPF 6 and the SCR 7 with NH$_3$. An ammonia slip catalyst (ASC) 8 is located downstream from the SCR 7 in the flow direction of the exhaust gas. At the end of the exhaust-gas line 2, there is a NO$_x$ sensor 9. In an alternative configuration, it is provided that the NH$_3$ generator 4 is arranged essentially in a double-walled exhaust-gas pipe 11 that has two NO$_x$ sensors 9, whereby one NO$_x$ sensor 9 is situated between the DOC 5 and the SDPF 6, while the other is behind the ASC 8.

Figure 2:
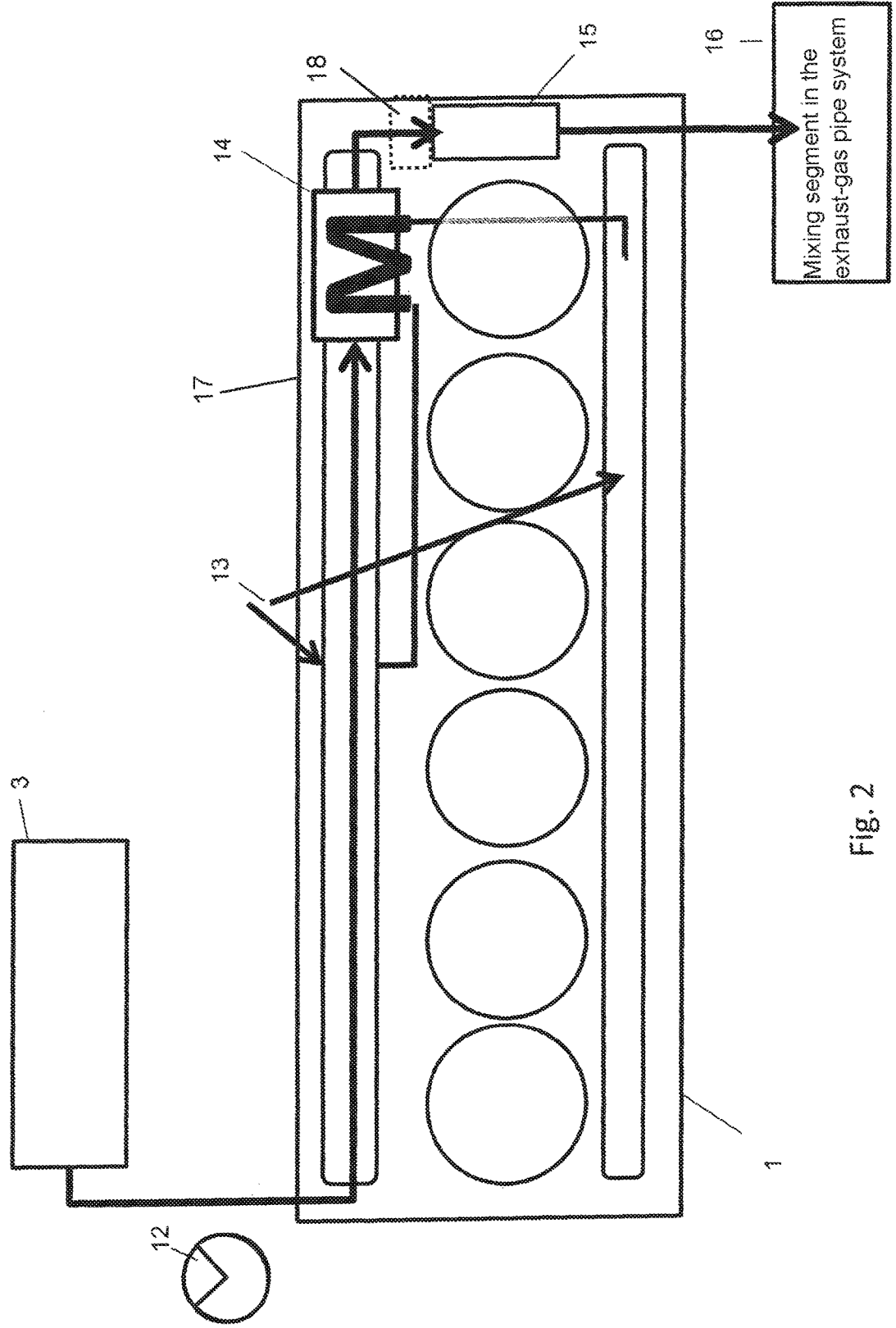
FIG. 2 shows a crankcase of an internal combustion engine.
Figure 3:
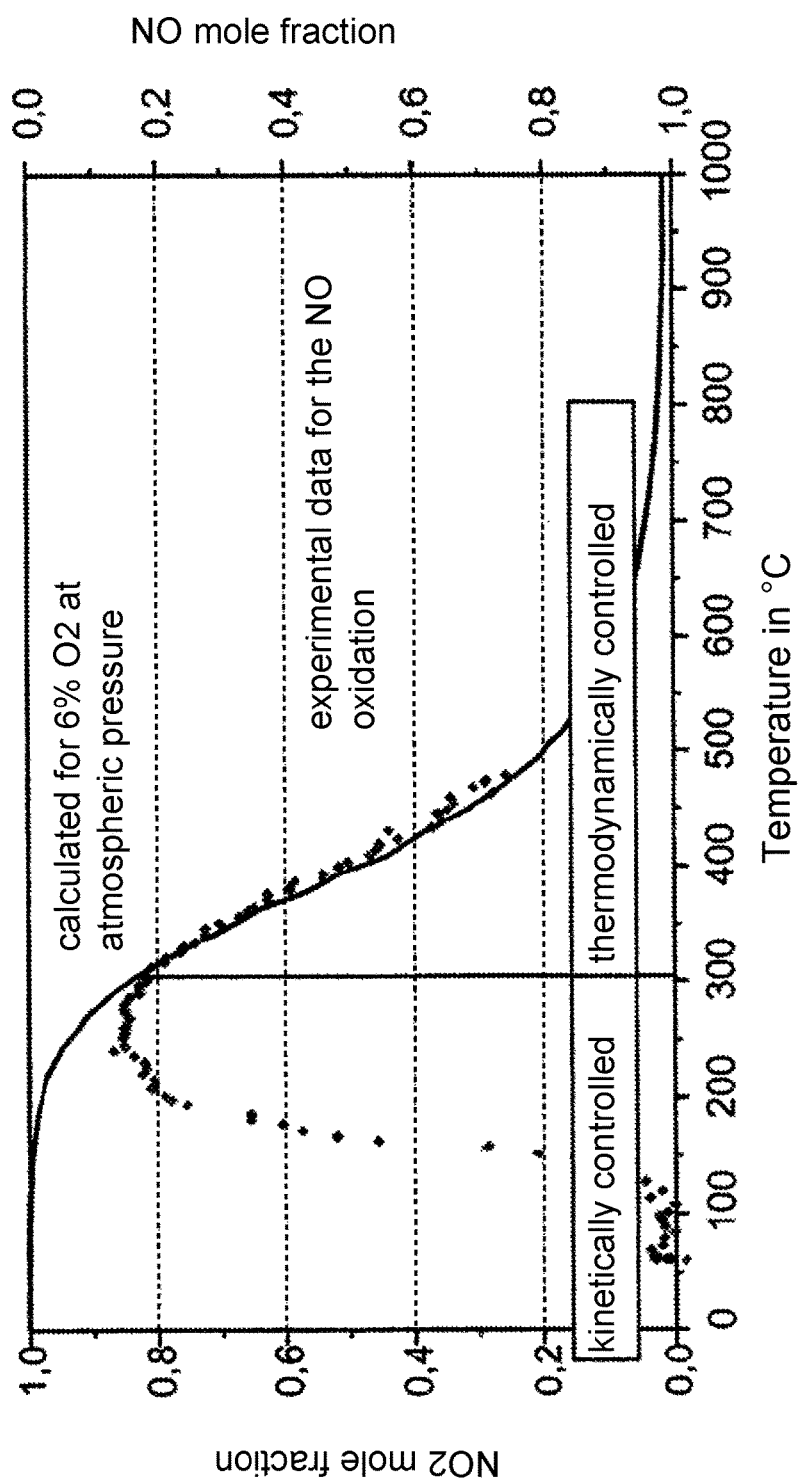
FIG. 3 shows a graph depicting experimental data for NO oxidation.
Figure 4:
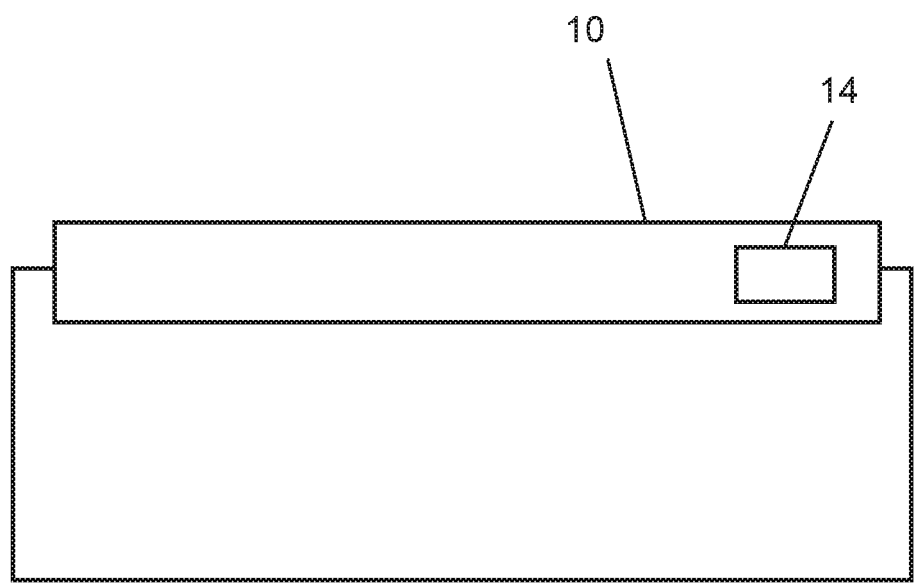
FIG. 4 shows the device according to another embodiment of the present invention.

FIG. 2 shows a crankcase 17 of an internal combustion engine 1 with a urea-water solution heat exchanger 14 integrated into the cooling circuit or into the water cooling jacket 13. The urea-water solution is held in the tank 3 located in the area of the internal combustion engine. The urea-water solution is conveyed by means of a liquid-urea pump 12 into the area of the crankcase 17 of the internal combustion engine 1 that carries the cooling water, where the urea-water solution heat exchanger 14 is located, and by which the urea-water solution is heated. In an alternative configuration schematically shown in FIG. 4, it is provided that the urea-water solution heat exchanger 14 is arranged in the cylinder head 10 of the internal combustion engine 1. After the heated urea-water solution leaves the urea-water solution heat exchanger 14, the liquid-urea pump 12 pumps it into the metering device 15. After the urea-water solution leaves the metering device 15, it reaches the mixing segment in the exhaust-gas pipe system 16, where it is further heated. The metering device 15 may be located directly behind an exhaust-gas turbocharger 18.

LIST OF ABBREVIATIONS

AdBlue 32.5%-aqueous urea solution
ANB exhaust-gas after-treatment
ASC ammonia slip catalyst
CSF particulate filter with a coating for the oxidation of exhaust-gas components
DOC diesel oxidation catalyst
DPF diesel particulate filter
NH$_3$ ammonia
NO$_x$ sum of the nitrogen oxides (NO, NO$_2$, N$_2$O, etc.) that are generated during the combustion in engines
SCR selective catalytic reduction
SDPF diesel particulate filter with an SCR-active coating

LIST OF REFERENCE NUMERALS 1 internal combustion engine
2 exhaust-gas line
3 urea-water solution tank
4 NH$_3$ generator
5 DOC
6 SDPF
7 SCR
8 ASC
9 NO$_x$ sensor
10 cylinder head
11 double-walled exhaust-gas pipe
12 liquid urea pump
13 water cooling jacket 14 urea-water solution heat exchanger
15 metering device
16 exhaust-gas pipe system

What is claimed is:

1. An internal combustion engine system comprising:
   at least one exhaust-gas line having at least one device for the after-treatment of the exhaust gas from an internal combustion engine and at least one urea-water solution tank;
   an urea tank including an urea-water solution;
   a pump pumping the urea-water solution into the internal combustion engine; and
   an urea-water solution heat exchanger in a cylinder head of the internal combustion engine, heating the urea-water solution pumped into the internal combustion engine.

2. The internal combustion engine system as recited in claim 1 wherein the at least one device for the after-treatment of the exhaust gas includes a diesel particulate filter with a selective catalytic reduction-active coating (SDPF).

3. The internal combustion engine system as recited in claim 2 further comprising a $NH_3$ generator installed on the internal combustion engine configured for processing the urea from the at least one urea-water solution tank to form ammonia for metering into the exhaust-gas line upstream from the SDPF.

4. The internal combustion engine system as recited in claim 1 wherein the exhaust-gas line has at least one diesel oxidation catalyst.

5. The internal combustion engine system as recited in claim 1 wherein the exhaust-gas line has at least one selective catalytic reduction.

6. The internal combustion engine system as recited in claim 1 where in the exhaust-gas line has at least one ammonia slip catalyst.

7. The internal combustion engine system as recited in claim 1 wherein the exhaust-gas line has at least one NOx sensor.

8. The internal combustion engine system as recited in claim 1 further comprising a metering device for the urea-water solution located directly behind an exhaust-gas turbocharger.

9. The internal combustion engine system as recited in claim 1 wherein the urea-water solution heat exchanger is integrated into the cooling circuit or into the water cooling jacket.

* * * * *